United States Patent
Hatazawa et al.

(10) Patent No.: US 6,378,494 B1
(45) Date of Patent: Apr. 30, 2002

(54) KNOCK DETECTION APPARATUS

(75) Inventors: Yasuyoshi Hatazawa; Koichi Okamura; Hisanori Nobe; Mitsuru Koiwa, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/628,421

(22) Filed: Jul. 28, 2000

(30) Foreign Application Priority Data

Sep. 1, 1999 (JP) ............................................. 11-247410
Mar. 27, 2000 (JP) ........................................ 2000-086590

(51) Int. Cl.[7] ........................... F02P 5/152; G01L 23/22
(52) U.S. Cl. ............................... 123/406.39; 73/35.04; 73/35.08
(58) Field of Search ...................... 123/406.29, 406.37, 123/406.38, 406.39; 73/35.03, 35.04, 35.05, 35.08

(56) References Cited

U.S. PATENT DOCUMENTS 5,979,406 A * 11/1999 Aoki et al. ............. 123/406.37
5,992,386 A * 11/1999 Nytomt et al. .......... 123/406.37
6,145,491 A * 11/2000 Wilstermann et al. ................. 123/406.37 X
6,185,984 B1 * 2/2001 Takahashi ................... 73/35.08
6,234,146 B1 * 5/2001 Tanaya et al. .......... 123/406.37

\* cited by examiner

Primary Examiner—Tony M. Argenbright
(74) Attorney, Agent, or Firm—Sughrue Mion, PLLC

(57) ABSTRACT

To obtain a knock detection apparatus which may obtain a good knock pulse S/N even if an ionic current generation amount is changed by the change of a kind of fuel or plugs, a knock detection apparatus for detecting a knock generated, in an internal combustion engine, in which a vibratory component superimposed on an ionic current generated by combustion of fuel is extracted, the component that is equal to or more than a knock detection threshold value is shaped in waveform into a pulse waveform, a knock strength is calculated through counting and calculation process of the number of pulses of the pulse waveform by an engine controlling unit, an ignition timing is controlled on the basis of the knock strength, comprises a knock detection threshold value adjusting unit for changing the knock detection threshold value on the basis of information of an ionic current.

8 Claims, 15 Drawing Sheets

KNOCK DETECTION APPARATUS

BACKGROUND OF THE INVENTION

1. Field of the Invention

The present invention relates to a knock detection apparatus for detecting a knock generated in an internal combustion engine and for controlling an ignition timing.

2. Description of the Related Art

It is generally known that ion is generated if fuel is burnt within a cylinder of an internal combustion engine. Therefore, if a probe to which a high tension voltage is applied it provided within the cylinder, it is possible to observe this ion in terms of the ionic current. Also, if the knock is generated in the internal combustion engine, since a vibratory component of the knock is superimposed on the ionic current, it is possible to detect the generation of the knock by extracting this vibratory component therefrom.

FIG. 13 is a circuit diagram showing a conventional knock detection apparatus using the ionic current. First of all, in this circuit, an ignition plug 1 is used as a detection probe for the ionic current. A high tension voltage (bias voltage) for detecting the ionic current by utilizing a secondary voltage of an ignition coil 2 is charged to a bias means 3. When the discharge for the ignition has been completed, the bias voltage charged during the discharge period is applied to an end of the plug 1 to detect the ionic current.

In this apparatus, a knock detection circuit 4 shapes a vibratory component, extracted from the ionic current, into a pulse form on the basis of a predetermined threshold value. A change of the number of pulses of the pulse form is calculated by an ECU 5. The ignition timing is adjusted by the result and the generation of the knock is suppressed.

In general, a peak value of the ionic current is changed in accordance with a kind of fuel or an operational condition of the internal combustion engine. However, there is a tendency that at a low rpm, the ionic current is small and at a higher rpm, is larger. The value thereof is in the range of several $\mu A$ to several hundreds of $\mu A$.

FIG. 14 is a block diagram showing the knock detection circuit 4 shown in FIG. 13 in more detail. When the ionic current is fed by the high tension voltage applied by the bias means 3, the ionic current is distributed into a mask 9 and a BPF (band pass filter) 8 by a current distributing means 7 for extracting the vibratory component. The mask 9 is composed of a means for shaping the form of the ionic current by the predetermined threshold value to generate a pulse and a means for masking the pulse for a predetermined period of time for interrupting the noise by the ignition. The combustion/misfire may be judged in accordance with the pulse which will be referred to as a combustion pulse.

A window 10 starts an integration of the ionic current then the combustion pulse is turned on. When this integrated value reaches a predetermined value, a knock detection window is opened. The output is fixed so as not to generate the knock pulse until the integrated value reaches the predetermined value. Also, when the combustion pulse is turned off, the knock detection window is closed.

After the vibratory component of the knock has been extracted by the BPF 8, it is amplified by an amplifier 11 The vibratory component is shaped in accordance with the predetermined threshold value in a comparator portion 13 so that the knock pulse is generated The predetermined threshold value is set in a knock detection threshold setting portion.

FIG. 15 shows an operative shape example of each section of the circuit shown in FIG. 14. Also, FIG. 16 is an S/N graph of the number of the knock pulses upon the knock/non-knock.

The explanation has been made so far concerning the single cylinder. However, an actual engine is composed of a plurality of cylinders. Now, the engine having four cylinders will be exemplified. FIG. 17 is a block diagram showing a detection circuit for processing the ionic current of the four cylinders. The biasing means 3 used for an ionic current detection, the current distribution means 7 and the mask 9 for generating the combustion pulse are provided for each cylinder.

On the other hand, each knock detection circuit 4 (BPF 8, amplifier 11 and window 10) has one processing circuit commonly used for a pair of cylinders which is not adjacent to each other in ignition order, i.e., #1 and #4, and #2 and #3, in order to downsize the circuit. The ignition order of the engine is #1, #3, #4 and #2. Then, the final knock pulse output is the "OR" of the outputs of the two processing circuits.

FIG. 18 shows an ignition signal (IB signal) for driving coils of the four cylinders, the ionic current and their vibratory component extraction waveforms. As shown in FIG. 18, when the ignition signal is turned on, the noise is generated in the ionic current. When the rpm of the engine is high or the ionic current generation period is long, the noise when the ignition signal is turned on in the knock detection period is overlapped with the knock detection period of the second former cylinder. Thus, there is a problem that the knock pulse is generated by the noise.

The knock pulse detected as mentioned before is transmitted to the ECU 5. In the ECU 5, a background level (knock judgement level) is calculated from the number of the knock pulses under the regular operational condition (when the knock is not generates. Then, it is judged that the knock is generated when the knock pulse exceeding the background level is generated, so that the ignition timing is changed in response to the knock strength in a direction in which the knock is not generated. When the knock is not generated, the ignition timing is likely to be gradually returned to the predetermined value to thereby perform the knock control.

However, if additives (such as K or Na) are mixed into the fuel, the ionic current is increased to a magnitude that is several time larger than that of the usual case even if the amount of the additives are small like several ppms. The ionic current has the same original frequency component. When the ionic current is increased, this frequency component becomes the same as the vibratory component upon the knock generation. In spite of the non-knock condition, the number of pulses is increased, so that the S/N ratio of the knock/non-knock disappears. There is a problem that the knock control is impossible. FIG. 19 shows the S/N ratio upon the containment of the additives measured under the same operational condition of the internal combustion engine as in that shown in FIG. 16.

The element relating to the increase/decrease of the ionic current is a time change of the internal combustion engine or the shape of the ignition plug in addition to the fuel characteristics. In these cases, the same problem might be also raised

SUMMARY OF THE INVENTION

In order to overcome the above-noted defect inherent in the prior art, an object of the present invention is to provide a knock detection apparatus for an internal combustion engine in which a threshold value of the knock detection is changed so that even if ionic current generation amount is changed due to the change of the fuel or the kinds of the plugs, it is possible to obtain a knock pulse S/N in accordance with a knock/non-knock.

Also, an object of the present invention is to provide a knock detection apparatus in which a knock pulse is not outputted by a noise upon turning on the ignition signal when means for extracting the vibratory components from the ionic current is commonly used in a pair of non-adjacent cylinders in the ignition order.

In order to achieve the above object, according to one aspect of the present invention, there is provided a knock detection apparatus for detecting a knock generated in an internal combustion engine and for controlling an ignition timing, in which a vibratory component superimposed on an ionic current generated by combustion of fuel is extracted, the component that is equal to or more than a knock detection threshold value is shaped in waveform into a pulse waveform, a knock strength is calculated through counting and calculation process of the number of pulses of the pulse waveform by an engine controlling means, an ignition timing is controlled on the basis of the knock strength, comprises a knock detection threshold value adjusting means for changing the knock detection threshold value on the basis of information of an ionic current.

According to another aspect of the present invention, there is provide the knock detection apparatus, wherein the knock detection threshold value adjusting means changes the knock detection threshold value on the basis of an integration value of the ionic current.

According to still another aspect of the present invention, there is provided a knock detection apparatus, wherein the knock detection threshold value adjusting means changes the knock detection threshold value on the basis of an integration value of the ionic current and a peak value of the ionic current.

According to a further aspect of the present invention, there is provided a knock detection apparatus, wherein the knock detection threshold value adjusting means changes the knock detection threshold value on the basis of an integration value of the ionic current, a peak value of the ionic current and a duty obtained by shaping the ionic current in waveform According to a still further aspect of the present invention, there is provided a knock detection apparatus, wherein the knock detection threshold value adjusting means smoothens a variation of the knock detection threshold value for every combustion cycle.

According to another aspect of the present invention, there is provided a knock detection apparatus, which further comprises a mask means for regarding a period during which said vibratory component of the ionic current is extracted as a period during which the combustion pulse is generated.

DESCRIPTION OF THE PREFERRED EMBODIMENTS

Embodiment 1

Figure 19:
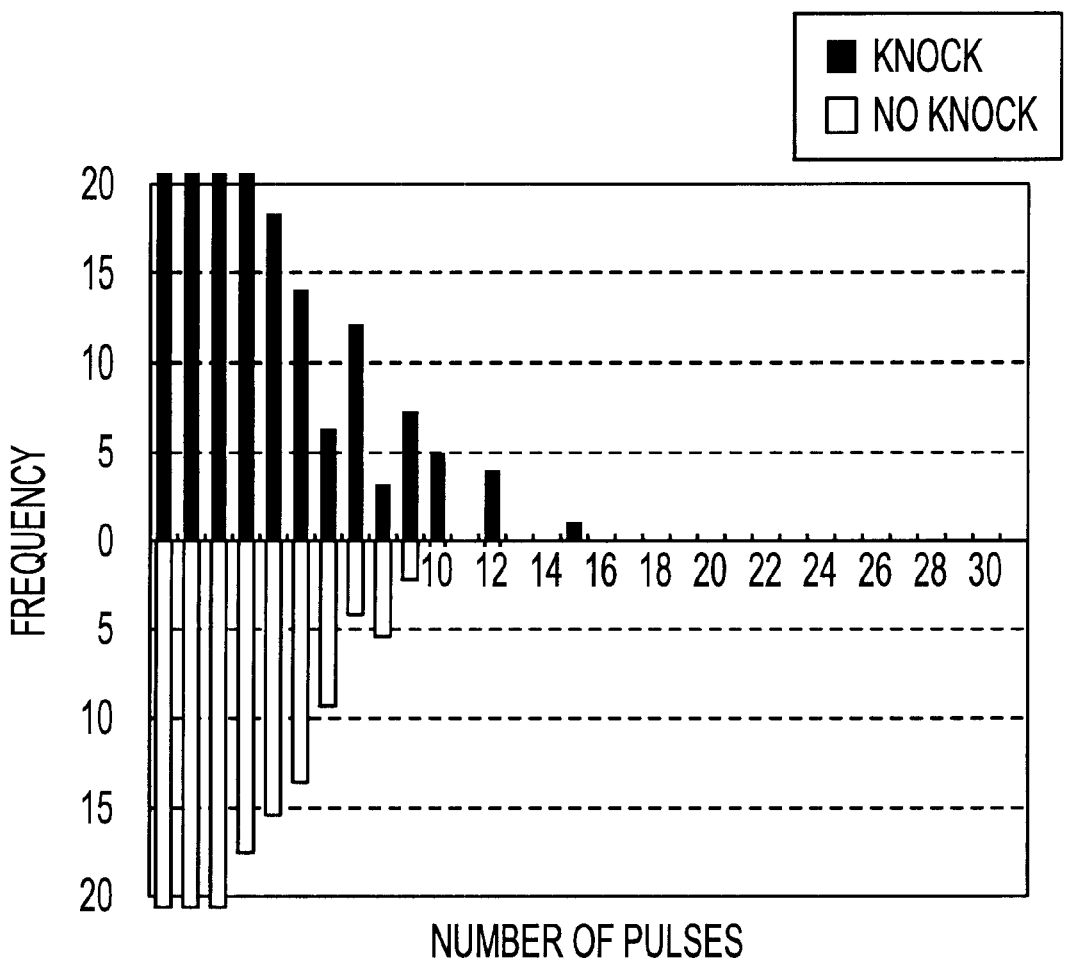
FIG. 19 is a S/N graph upon additive mixture measured under the same engine operational condition as that of FIG. 16.

In this embodiment, a case where an additive is mixed into fuel so that an ionic current is changed will now be described. As mentioned above, if the fuel into which the additive is mixed is used in an apparatus in which an optimum knock detection threshold value is set for the fuel into which the additive is not mixed, the S/N of the knock pulse number upon the knock/non-knock is as shown in FIG. 19.

Figure 1A:
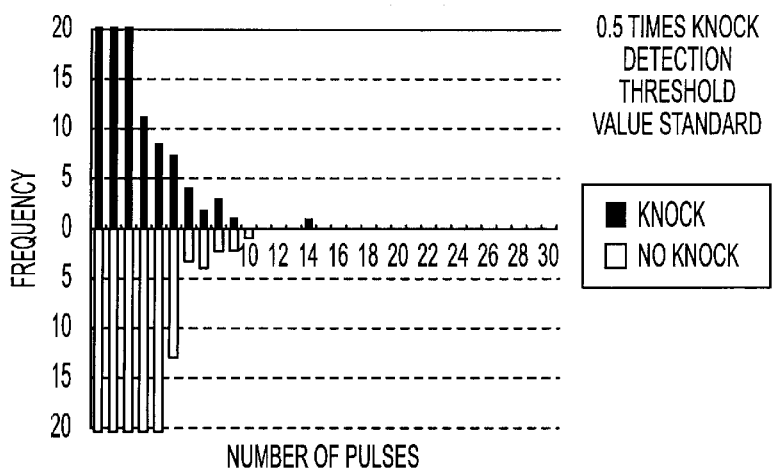
FIGS. 1A–1C are graphs showing the possibility that a good S/N ratio may be obtained if a knock detection threshold value is adjusted for fuel into which an additive is mixed.
Figure 1B:
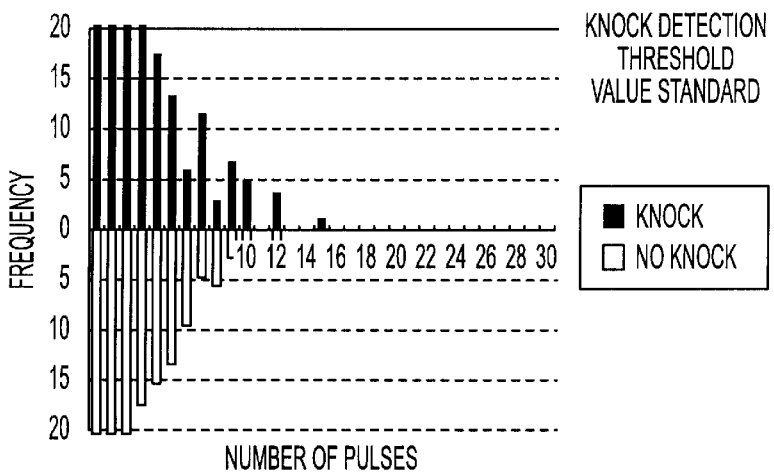
Figure 1C:
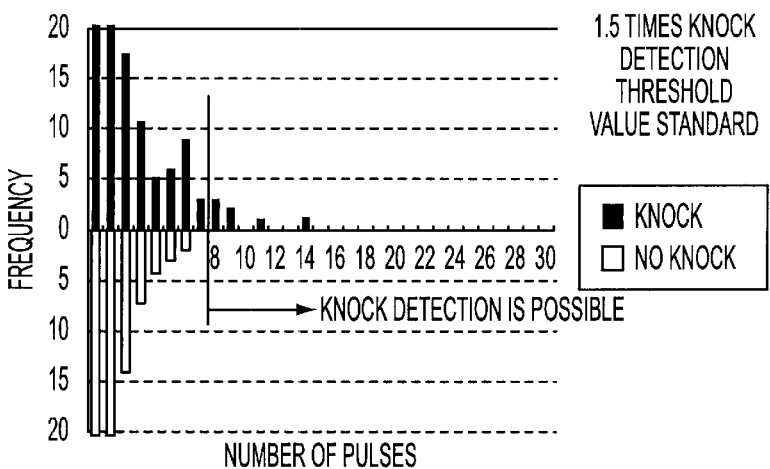

However, if the knock detection threshold value is adjusted for the fuel into which the additive is mixed, it is possible to obtain a good S/N ratio as shown in FIG. 1. Namely, in FIG. 1, from a standard knock detection threshold value (b) to the knock detection threshold value (a) that is 0.5 times the standard one, it is impossible to obtain the good S/N ratio but at the knock detection threshold value (c) that is 1.5 times the standard one, it is possible to obtain the good S/N ratio.

Figure 2:
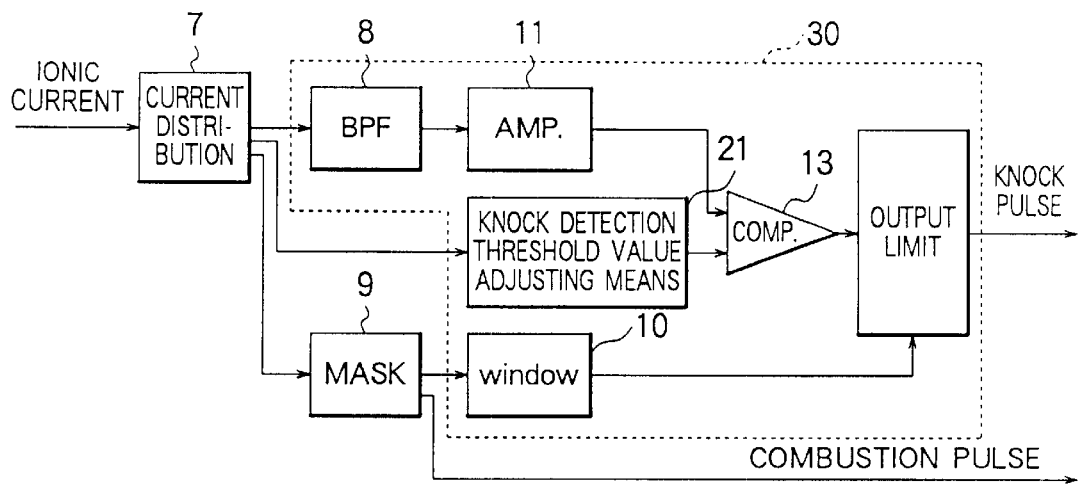
FIG. 2 is a block diagram showing a primary part of a knock detection apparatus according to the present invention.

For this reason, as shown in a block diagram of FIG. 2, a knock detection threshold value adjusting means 21 for changing the knock detection threshold value by using information included in the ionic current is provided in a knock detection circuit 30 instead of a conventional knock detection threshold value setting section so that the knock pulse May be outputted irrespective of a magnitude of the ionic current.

In the knock detection apparatus according to this embodiment, the knock detection threshold value adjusting means 21 for adjusting the knock detection threshold value in accordance with the information of the ionic current per se is provided so that the detection precision of the knock pulse may be enhanced.

Embodiment 2

Figure 3:
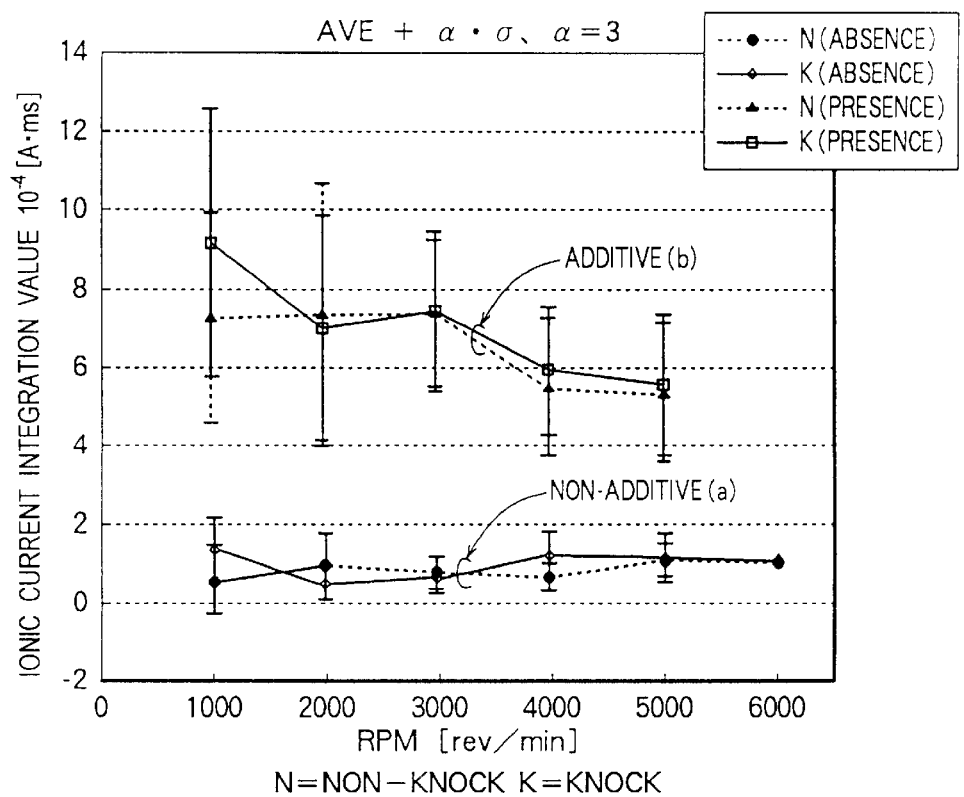
FIG. 3 is a graph showing an ionic current integration value in a period during which a combustion pulse is open to which a mask is applied for a predetermined period of time for the purpose of cutting the noise off while the ionic current is shaped in waveform by a predetermined threshold value.

The ionic current is shaped in waveform by a predetermined threshold value, and an ionic current integration value for a period during which the combustion pulse is open to which the mask is applied for a predetermined period of time for the purpose of noise cutting-off is shown in FIG. 3. In FIG. 3, an ordinate represents an ionic current integration value $10^{-4}$[A·ms] and an abscissa represents a rpm [rev/min] in FIG. 3, character (a) represents normal fuel into which no additive is mixed, character (b) represents fuel into which the additive is mixed, in which an abscissa represents an engine rpm and an ordinate represents an ionic current integration value. It is sufficient to change the knock detection level between (a) and (b).

Figure 4:
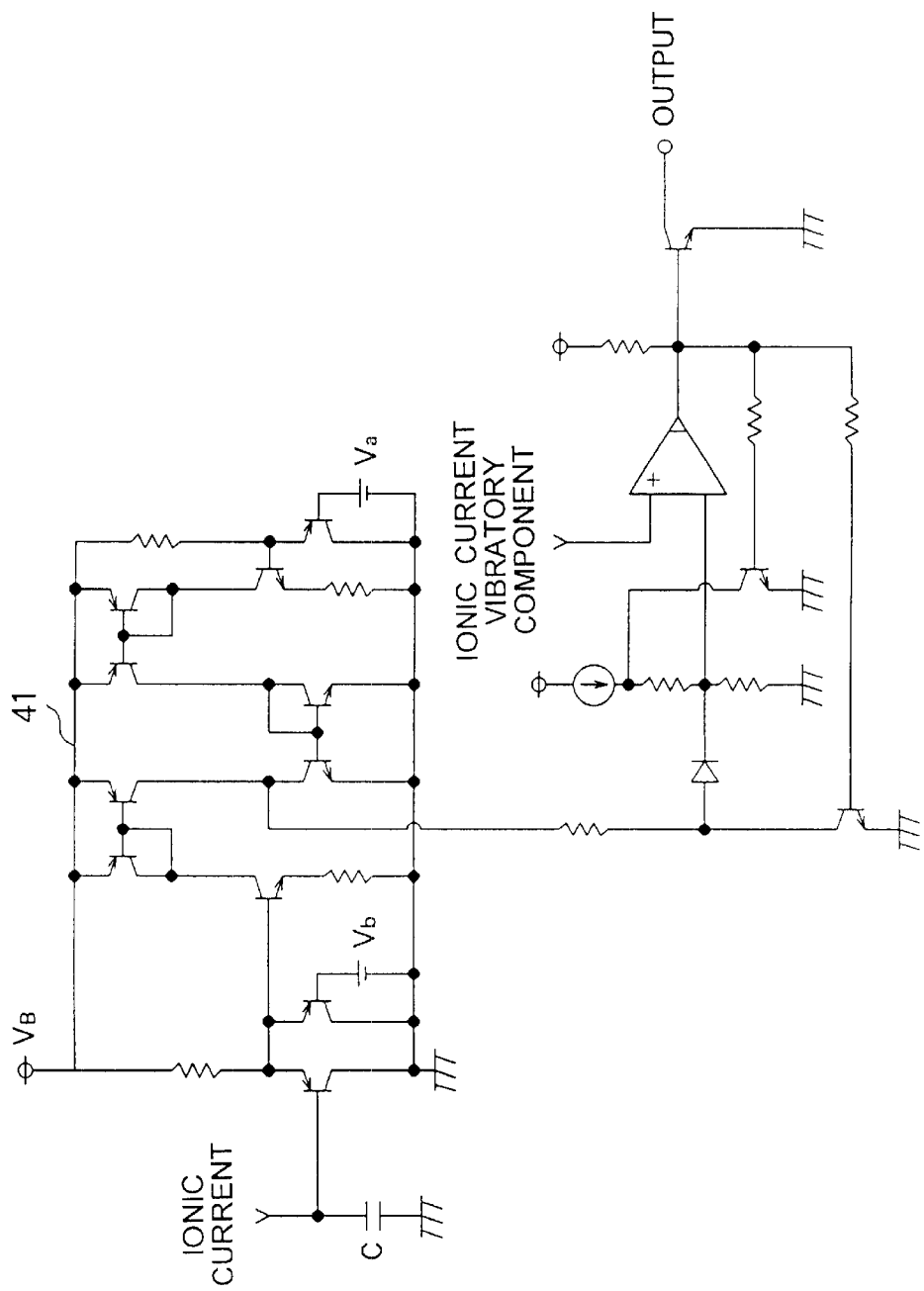
FIG. 4 is a circuit diagram of a threshold value adjusting circuit.
Figure 5:
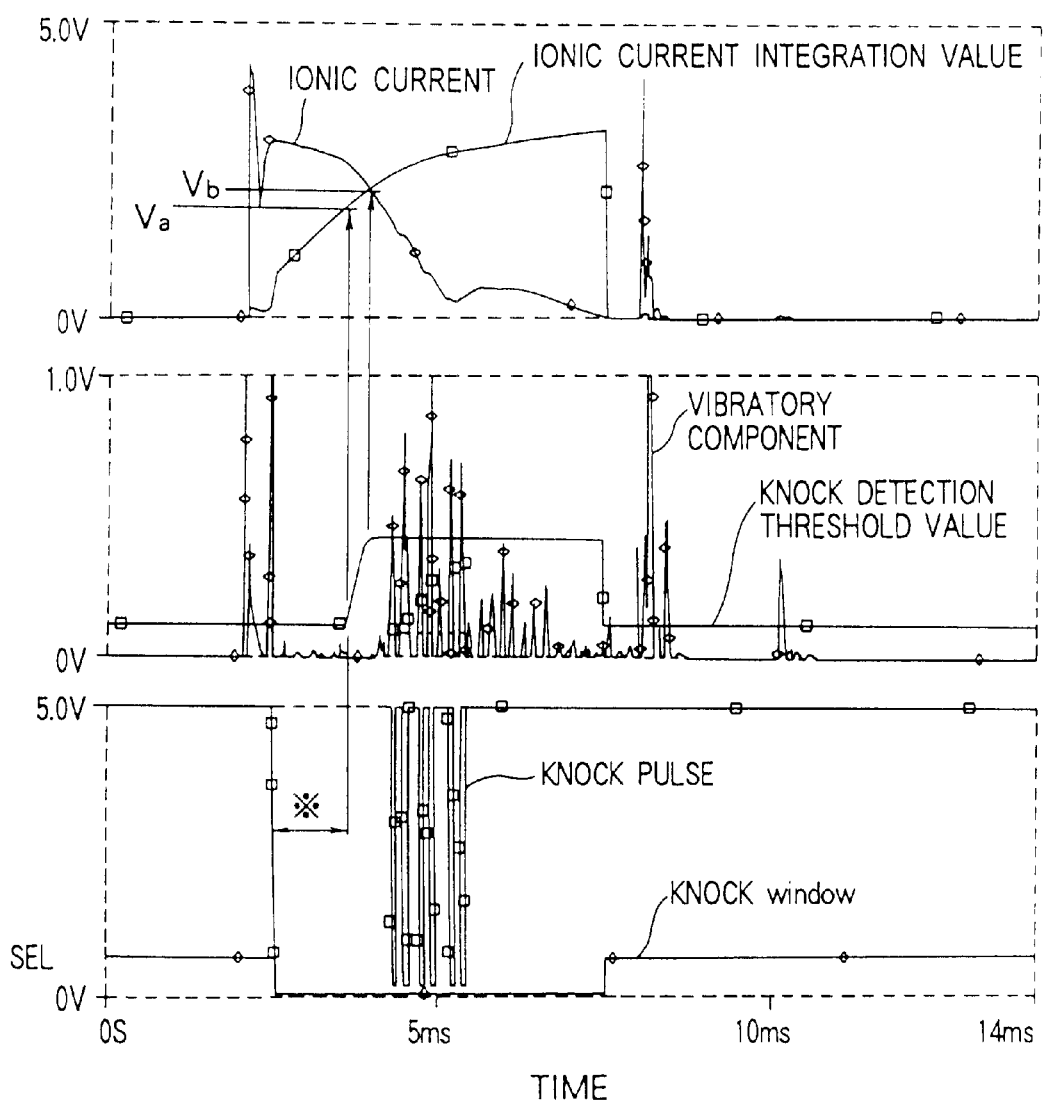
FIG. 5 is an operational waveform of each part of the threshold value adjusting circuit (rpm 3,000 [rev/min])

FIG. 4 shows the threshold value adjusting circuit of the knock detection circuit and FIG. 5 shows an operational waveform of each part. In FIGS. 4 and 5, the threshold value adjusting circuit 41 used as a knock detection threshold value adjusting means in accordance with This embodiment takes such a structure that, when the ionic current integration value is equal to or more than Va (standard voltage), the threshold value that is the output starts to increase, and when it is equal to or more than Vb (clamp voltage), the threshold value is saturated at a predetermined value.

Then, when the combustion pulse is closed, the integration value is reset, and the knock detection threshold value is returned back to the initial value. In this embodiment, although the knock detection threshold value is changed in an analog manner, it goes Without saying that the value may be changed in a digital manner.

In the knock detection apparatus according to this embodiment, the ionic current integration value is used, thereby adjusting the threshold value without changing the circuit on a large scale.

Embodiment 3

Figure 6:
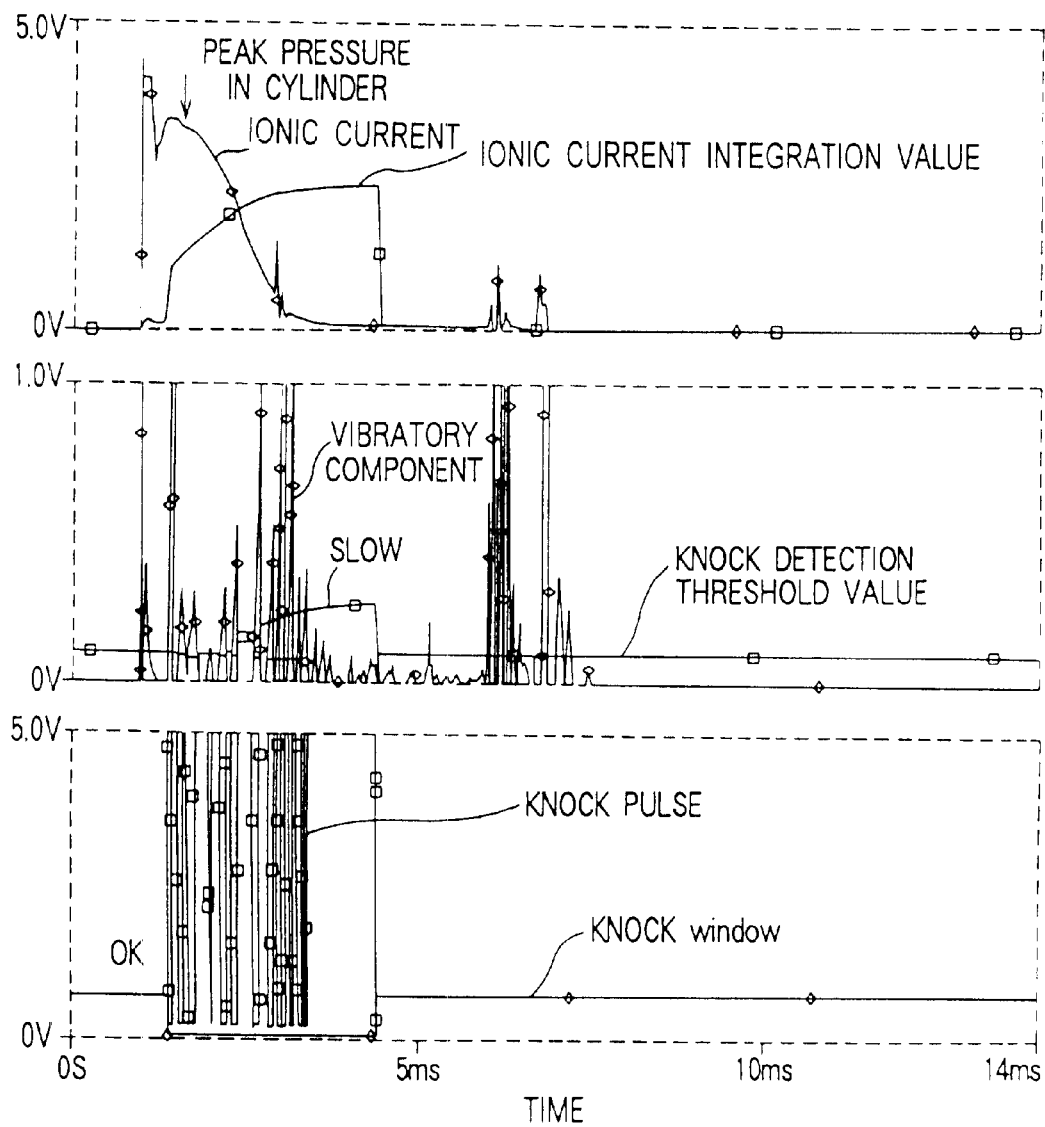
FIG. 6 is an operational waveform of each part of the threshold value adjusting circuit (rpm 5,000 [rev/min])

In the second embodiment, with respect to the ionic current integration value, as the engine rpm is higher, the difference between the absence and the presence of the additive is small. Accordingly, there is a tendency that the knock detection threshold value is hardly increased in the high rpm region. Namely, FIG. 5 showing the second embodiment is an example of a waveform at rpm 3,000 [rev/min]. In the threshold value adjusting circuit, the ionic current integration value is equal to or more than Vb and the knock detection threshold value is saturated. On the other hand, FIG. 6 shows a waveform example at rpm 5,000 [rev/min]. The knock detection threshold value is not saturated while the initial rise thereof is slow.

Figure 7:
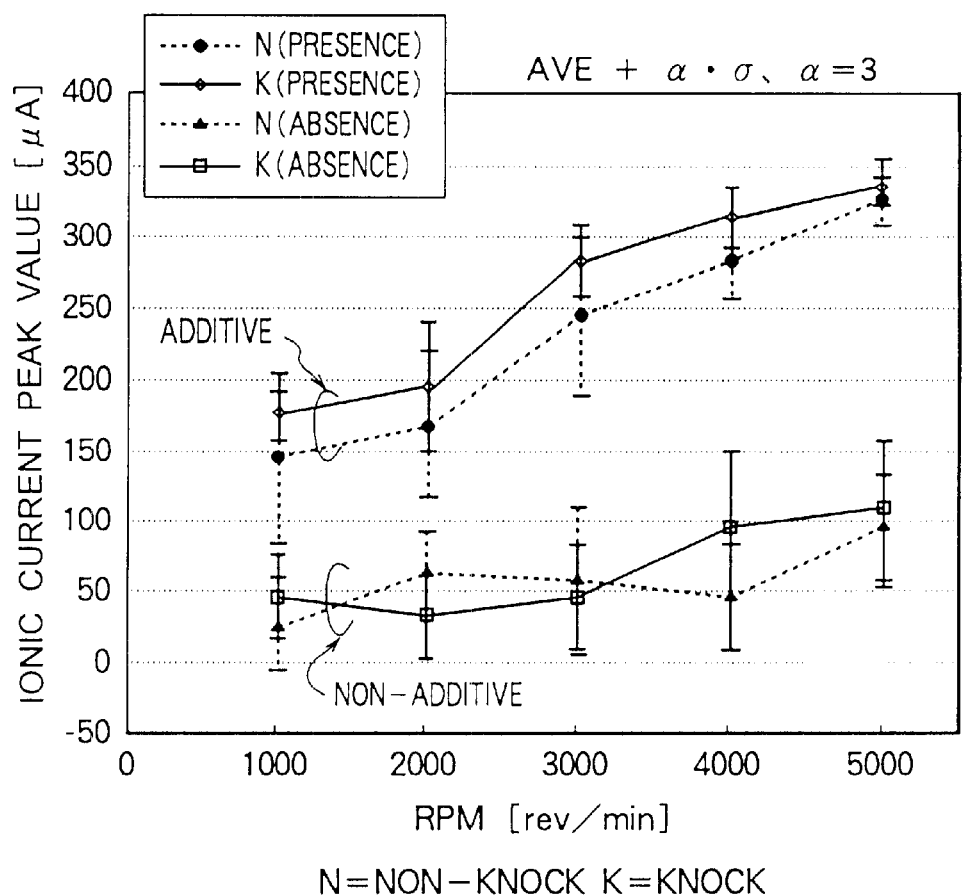
FIG. 7 is a graph showing a state in which the higher the rpm, the higher the ionic current peak value will become.
Figure 8:
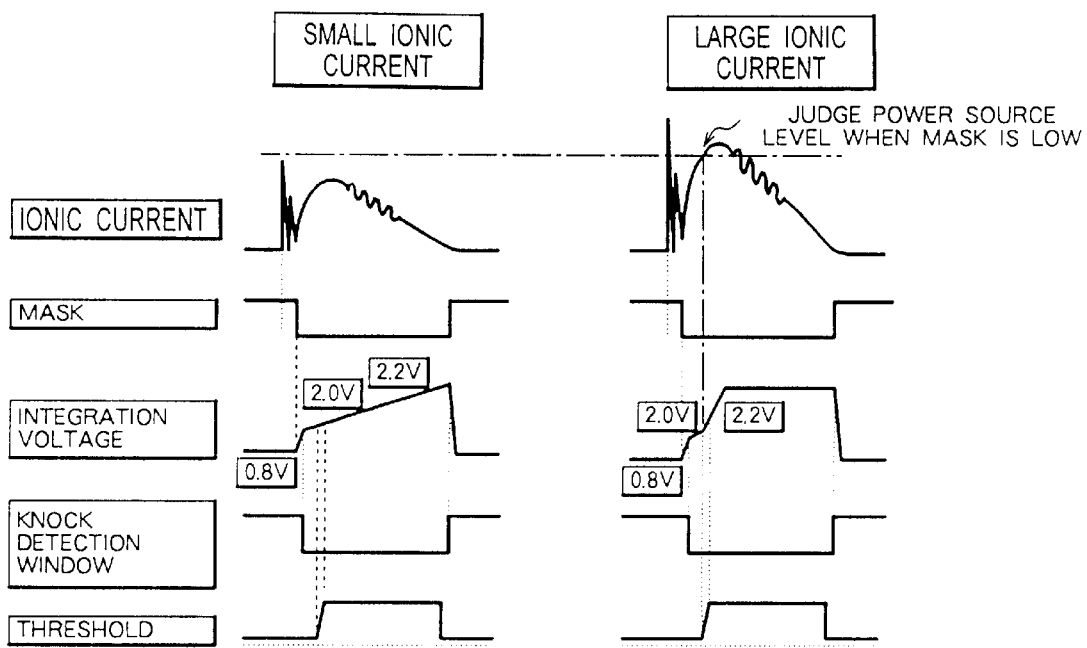
FIG. 8 is a chart showing a state in which an initial rise of the knock detection threshold value is obtained earlier in a third embodiment of the present invention.

On the other hang, as shown in FIG. 7, there is a tendency that the higher the rpm, the larger the ionic current peak value will become. In FIG. 7, an ordinate represents the ionic current peak value [A] and an abscissa represents the rpm [rev/min]. Therefore, in the case where the ionic current peak value is equal to or more than a predetermined value, if the means for increasing the integrationic current in accordance with the second embodiment is caused to work, the initial rise of the knock detection threshold value appears earlier as shown in FIG. 8. Accordingly, even by the waveform at a high rpm with a small ionic current integration value, it is possible to enhance the knock detectability.

In the knock detection threshold value adjusting means according to this embodiment, as shown in FIG. 8, when the ionic current integration value is equal to or more than 0.8 [V], the knock detection window (Knock Detection Window) is open. Then, until the integration value reaches 0.8 [V], a first integrationic current controlling circuit (for charging one third of the ionic current) (not shown) and a second integrationic current controlling circuit (for charging one twentieth) (not shown) both take charging actions. Also, when it reaches 0.8 [V], the charge is effected only by the second integrationic current controlling circuit while the first integrationic current controlling circuit stops. Here, when the peak value of the ionic current reaches the judgement level, the first integrationic current controlling circuit is driven to increase the charging current. Incidentally, in FIG. 8, Va is 2.0 [V] and Vd is 2.2 [V].

In the knock detection apparatus according to this embodiment, the knock detection threshold value is changed by using the ionic current integration value and the peak current value so that the adjustment of the knock detection threshold value may be performed in a stable manner in the high rpm region.

Embodiment 4

In the third embodiment, the knock detection threshold value is changed, which is predominantly caused by the ionic current integration value at a low rpm whereas by the ionic current peak value at a high rpm. However, in the intermediate rpm region, it is impossible to well control the threshold value even with any parameter, and there are some cases that the initial rise of the knock detection threshold value might hardly be obtained.

Figure 9:
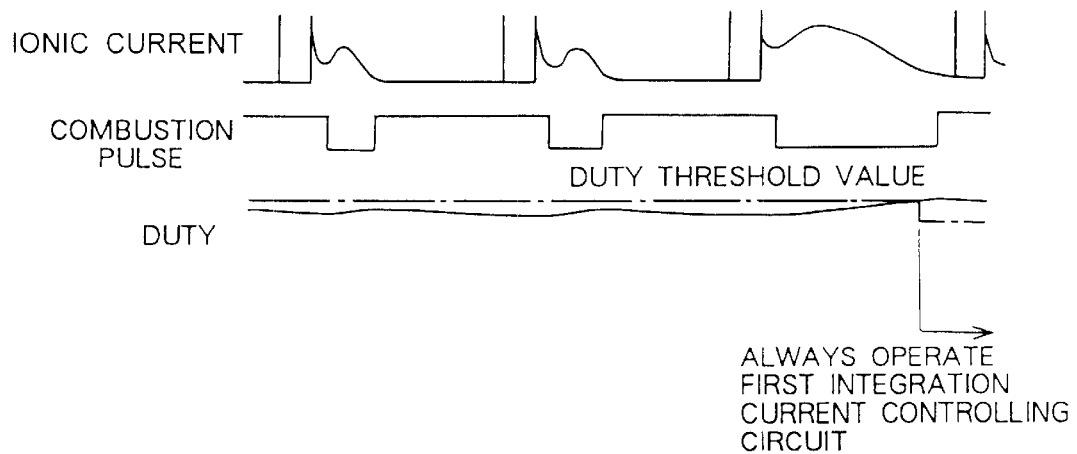
FIG. 9 is a chart showing a possibility that, in accordance with a fourth embodiment of the present invention, a capacitor is charged or discharged on the basis of a duty of a combustion pulse, the ionic current integrationic current is increased in the case where a voltage exceeds a predetermined value and an initial rise of the knock detection threshold value may be obtained earlier in the intermediate rpm region.

Therefore, in the knock detection threshold value adjusting means according to this embodiment, the integrationic current is controlled by duty of the combustion pulse as a third parameter. The duty of the combustion pulse allows combustion period to be prolonged when the additive is mixed into the fuel and the duty becomes large. As shown in FIG. 9, the capacitor is charged or discharged on the basis of this duty of the combustion pulse. In the case where this voltage exceeds a predetermined value, in the same manner as in the third embodiment, the ionic current integrationic current is increased so that the initial rise of the knock detection threshold value may be obtained earlier in the intermediate rpm range.

In the knock detection apparatus according to this embodiment, the integrationic current is controlled by the duty of the combustion pulse in addition to the ionic current integration value and the peak current value. It is therefore possible to control in a stable manner the adjustment of the knock detection threshold value in a range from a low rpm to a high rpm.

Embodiment 5

Figure 10:
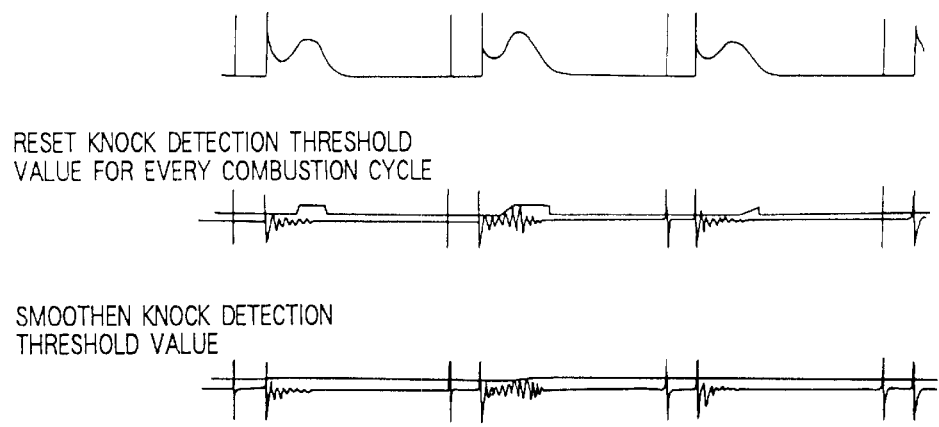
FIG. 10 is a chart showing smoothing the knock detection threshold value for every combustion cycle.

In the embodiments thus far described, the knock detection threshold value is reset for every combustion cycle. For this reason, there is a problem that until the knock detection threshold value is raised (for example, in a period indicated by * in FIG. 5), the noise pulse is outputted (detected). Therefore, as shown in FIG. 10, the knock detection threshold value for every combustion cycle is smoothed to thereby obtain the knock detection threshold value in a stable manner from the time when the knock detection starts. Thus, the knock detectability is enhanced according to this embodiment. For example, the charge is stored in the capacitor to thereby smooth the knock detection threshold value.

In the knock detection apparatus according to this embodiment, the knock detection threshold value is smoothed so that the noise that is generated until the knock detection threshold value is raised is decreased and to thereby enhance the knock detectability.

Embodiment 6

Figure 18:
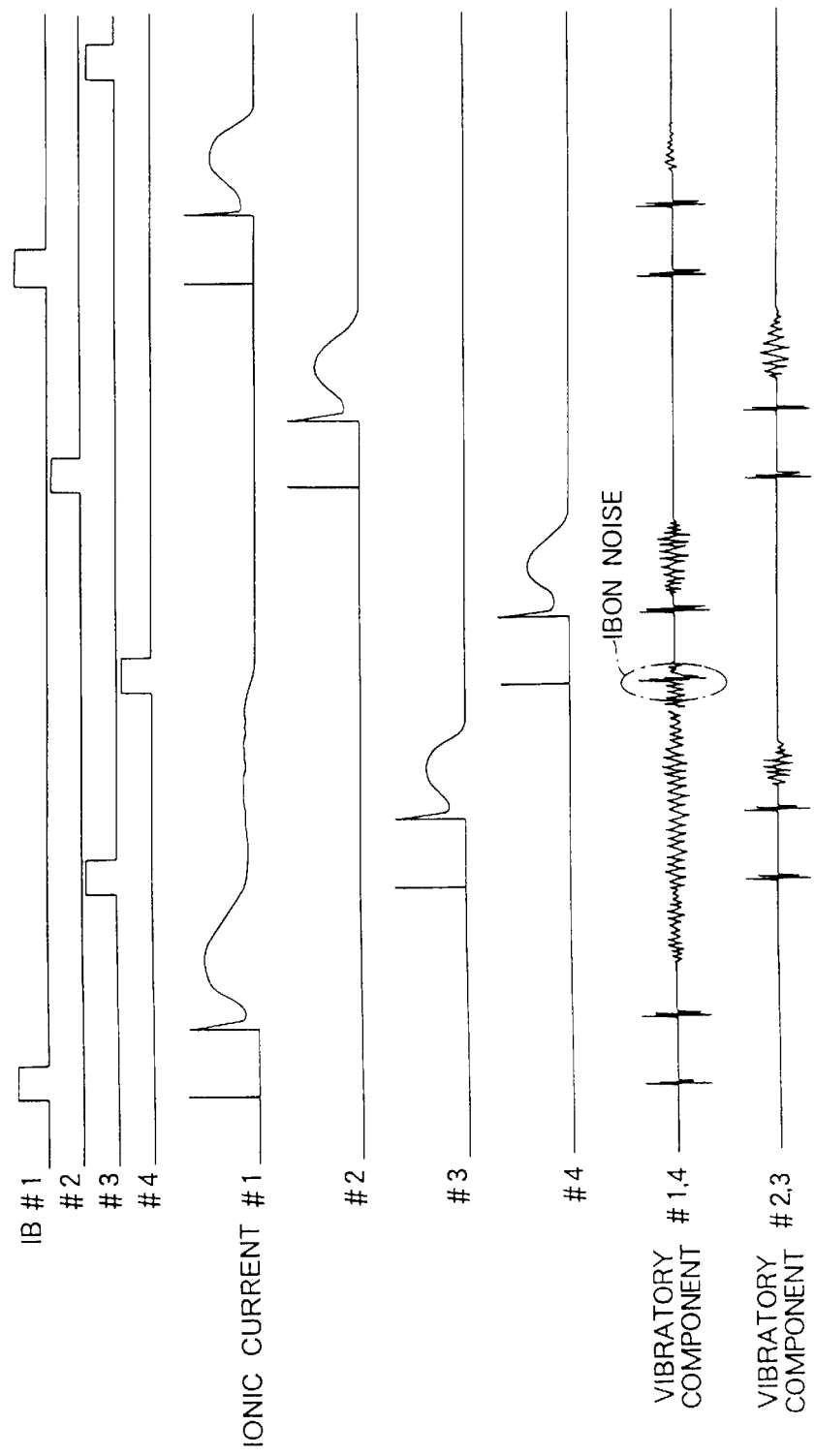
FIG. 18 is a chart showing ignition signal (IB signal) for driving coils for the four cylinders, the ionic current and vibratory component extraction waveform therefor.

In the embodiments thus far described, as shown in FIG. 18, there is a problem that the noise upon turning on the ignition signal (IB signal) of the second former cylinder is outputted as a knock pulse particularly in the high rpm region. This is because, assuming that the ionic currents of #1 and #4 cylinders are not overlapped, the sum of the ionic currents of #1 and #4 cylinders is made, and this signal is inputted into the common knock detection circuit 30. For this reason, even if the knock of #1 cylinder is mixed with the noise of the knock of #4 cylinder, it is impossible to distinguish them from each other, and the mixed noise is recognized as the vibratory components of #1 cylinder. Accordingly, in some cases, the control is not well performed.

In accordance with the embodiment, in order to overcome this problem, in order to remove the noise when the ignition signal (IB signal) is turned on, before the ionic current is inputted into the common knock detection circuit 30, the ionic current is not fed to the knock detection circuit 30 in the case where the generation period of the ionic current is not longer than a predetermined period, and a mask means (mask 9 and switch 14) for allowing the ionic current to flow to the knock detection circuit 30 is provided only in the case where the ionic current having a predetermined current level or more is generated.

Figure 11:
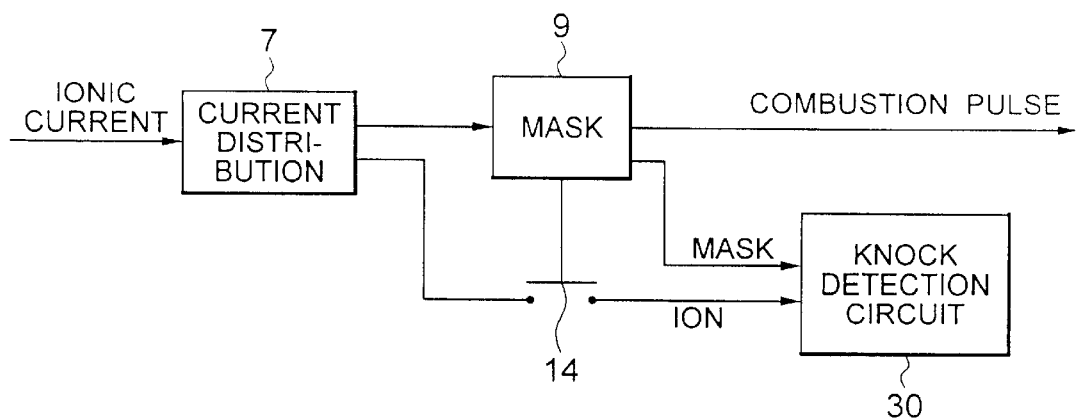
FIG. 11 is a block diagram showing a primary part of another example of a knock detection apparatus according to the present invention.

FIG. 11 is a block diagram showing a primary part of another example of a knock detection apparatus according to the present invention. In this embodiment, a combustion pulse to be outputted from the mask 9 as a signal for moving the switch 14 for opening and closing the input line of the ionic current directed to the knock detection circuit 30 is used. The reason for this is that the mask 9 for forming the combustion pulse is provided for the purpose of preventing the combustion pulse from being generated by the noise when the ignition signal (IB signal) generated irrespective of the combustion or misfire is turned on, and advantageously, this combustion pulse is utilized to dispense with a necessity to newly add a timer circuit or the like.

Figure 12:
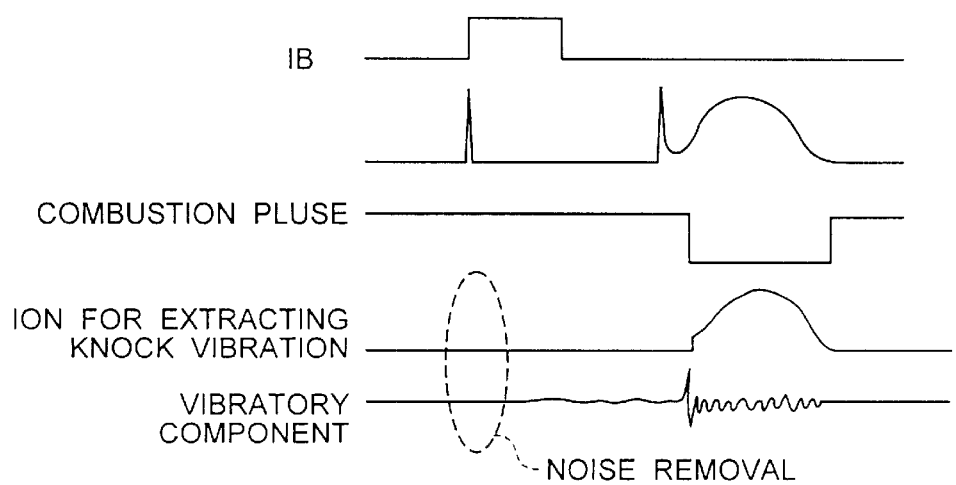
FIG. 12 is a chart showing the case where a mask means for masking ionic current from which the knock vibratory component is to be picked up with a combustion pulse is provided for cutting the noise component.
Figure 13:
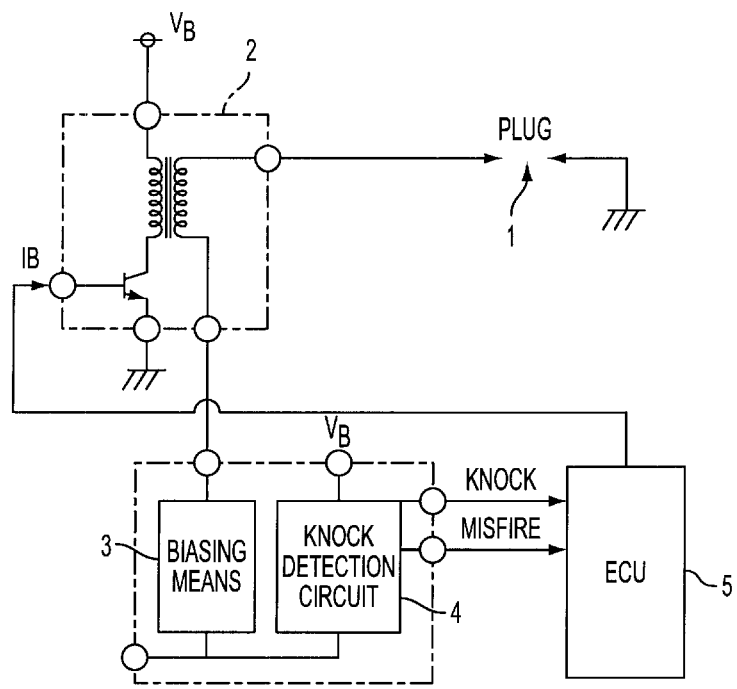
FIG. 13 is a circuit diagram showing a conventional knock detection apparatus using an ionic current.
Figure 14:
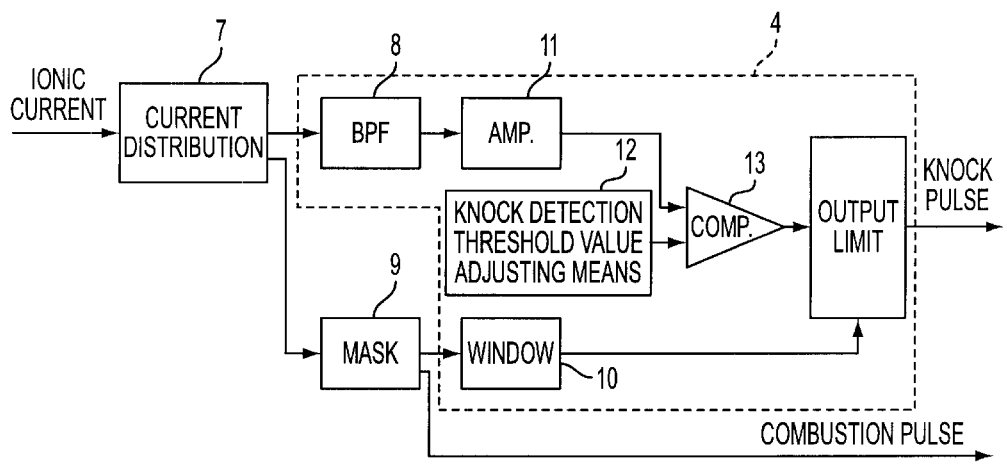
FIG. 14 is a block diagram showing in detail the knock detection circuit shown in FIG. 13.
Figure 15:
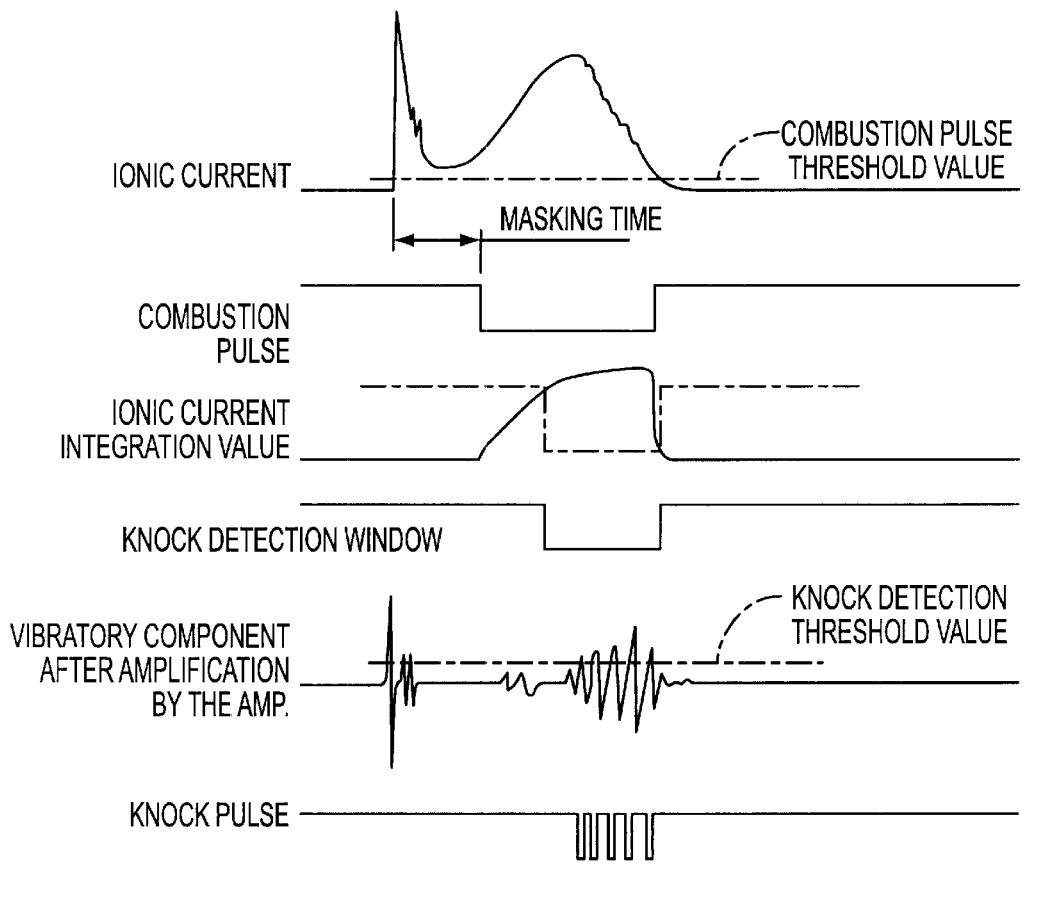
FIG. 15 is an operation waveform example of each part of the circuit shown in FIG. 14.
Figure 16:
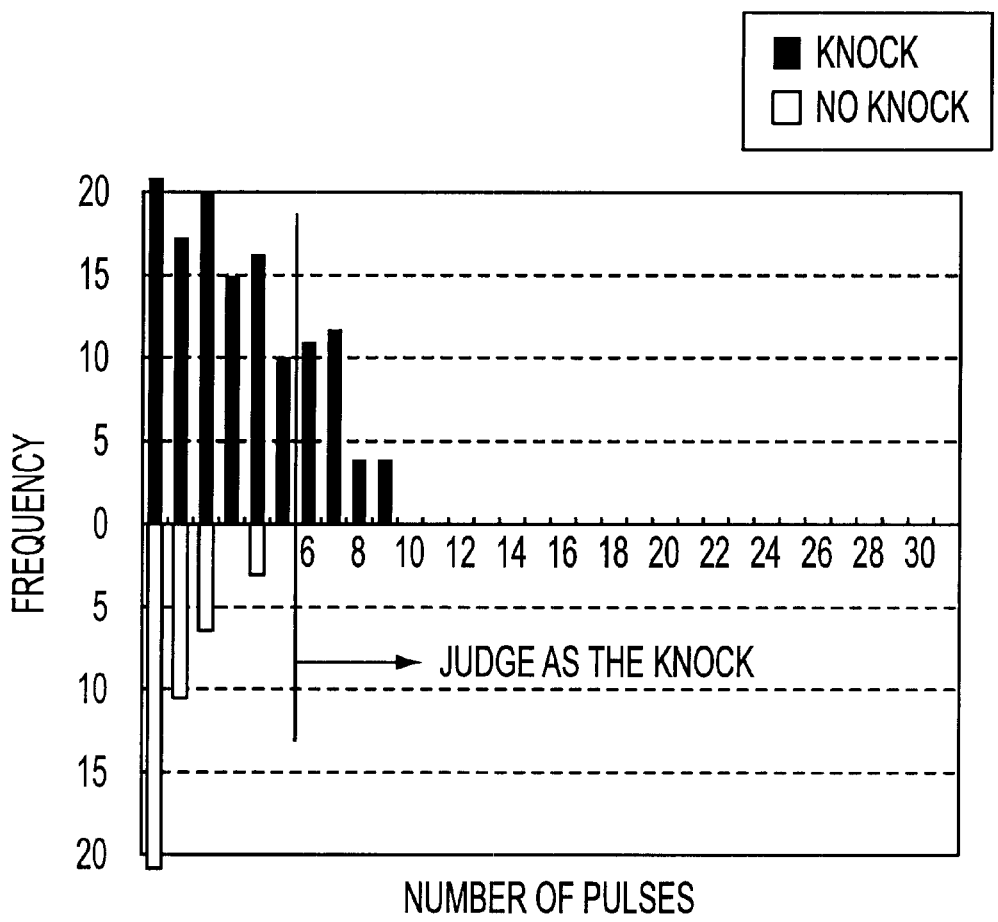
FIG. 16 is a S/N graph of the number of knock pulses upon knock/non-knock.
Figure 17:
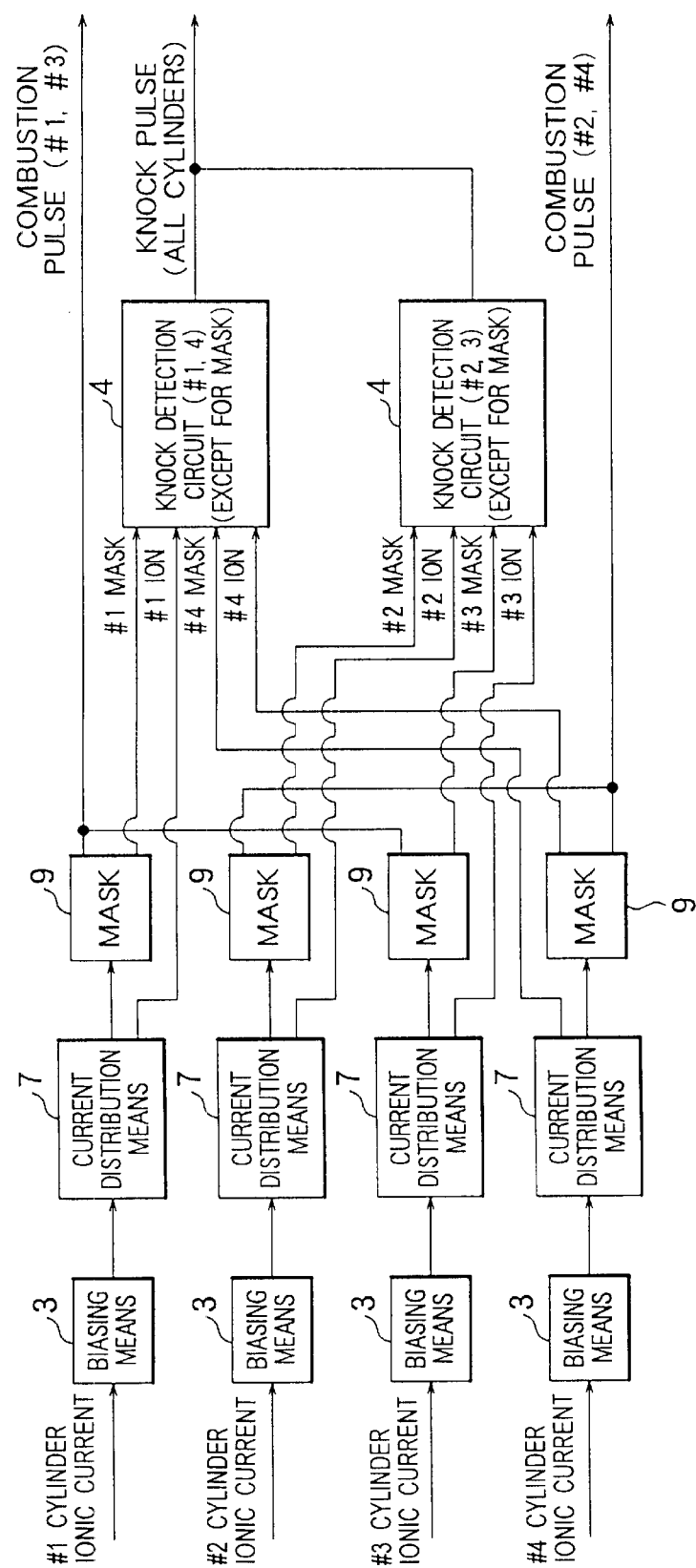
FIG. 17 is a block diagram of a detection circuit for processing an ionic current of four cylinders.

As shown in FIG. 15, the operation of the mask 9 for generating the combustion pulse is to delay the generation of the combustion pulse until the current that is equal to or more than the combustion pulse threshold value flows for the mask period or longer. Although the knock detection circuit 30 starts the knock detection Window integration from the time when the combustion pulse is open, it transmits the ionic current to the knock detection circuit 30 only for the period during which the combustion pulse is open. Thus, it is possible to improve the knock detection circuit 30 without modifying the circuit, and it is possible to cut off the noise component as shown in FIG. 12. Then, it is possible to a good knock pulse S/N ratio of knock/non-knock without receiving any adverse affect men the ignition signal (IB signal) is turned on.

In the knock detection apparatus according to this embodiment, the ionic current on which the noise is superimposed when the ignition signal (IB signal) is turned on, is masked to reduce the noise pulse to thereby make it possible to enhance the knock detection property.

The knock detection apparatus according to the present invention has the following effect.

According to one aspect of the present invention, there is provided a knock detection apparatus for detecting a knock generated in an internal combustion engine and for controlling an ignition timing, in which a vibratory component superimposed on an ionic current generated by combustion of fuel is extracted, the component that is equal to or more than a knock detection threshold value is shaped in waveform into a pulse waveform, a knock strength is calculated through counting and calculation process of the number of pulses of the pulse waveform by an engine controlling means, an ignition timing is controlled on the sis of tie knock strength, comprises a knock detection threshold value adjusting means for changing the knock detection threshold value on the basis of information of an ionic current. Hence, the knock detection threshold value is adjusted in accordance with te information of the ionic current per se so that the detection precision of the knock pulse may be enhanced.

According to another aspect of the present invention, there is provided the knock detection apparatus, wherein the knock detection threshold value adjusting means changes the knock detection threshold value on the basis of an integration value of the ionic current. Hence, it is possible to adjust the threshold value without changing the circuit on a large scale.

According to still another aspect of the present invention, there is provided a knock detection apparatus, wherein the knock detection threshold value adjusting means changes the knock detection threshold value on the basis of an integration value of the ionic current and a peak value of the ionic current. Hence, it is possible to perform the adjustment of the knock detection threshold value in the high rpm range in a stable manner.

According to a further aspect of the present invention, there is provided a knock detection apparatus, wherein the knock detection threshold value adjusting means changes the knock detection threshold value on the basis of an integration value of the ionic current, a peak value of the ionic current and a duty obtained by shaping the ionic current in waveform Hence, it is possible to perform the adjustment of the knock detection threshold value in a range from a low rpm region to a high rpm region in a stable manner.

According to a still further aspect of the present invention, there is provided a knock detection apparatus, wherein the knock detection threshold value adjusting means smoothens a variation of the knock detection threshold value for every combustion cycle. Hence, the knock detection threshold value is smoothed so that the noise that is generated until the knock detection threshold value is raised is decreased to thereby enhance the knock detectability.

According to another aspect of the present invention, there is provided a knock detection apparatus, which further comprises a mask means for regarding a period during which said vibratory component of the ionic currents extracted as a period during which the combustion pulse is generated. Then, the ionic current on which the noise is superimposed when the ignition signal is turned on is masked so that a range of te ionic current from which the knock vibratory component is to be picked up may be limited to a region where the knock is superimposed, thereby reducing the noise pulse and making it possible to enhance the knock detection property.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed is:

1. A knock detection apparatus for detecting a knock generated in an internal combustion engine and for controlling an ignition timing, in which a vibratory component superimposed on an ionic current generated by combustion of fuel is extracted, said component that is equal to or more than a knock detection threshold value is shaped in waveform into a pulse waveform, a knock strength is calculated through counting and calculation process of the number of pulses of said pulse waveform by an engine controlling means, an ignition timing is controlled on the basis of the knock strength, comprising:

filter means for extracting the vibratory component that is superimposed on the ionic current; and knock detection threshold value adjusting means for directly receiving the ionic current without having the ionic current filtered by said filtering means, said knock detection threshold value adjusting means changing said knock detection threshold value on the basis of information of said directly received ionic current, wherein the vibratory component passing through said filter means and having a value equal to or more than the knock detection threshold value is shaped into the pulse waveform.

2. The knock detection apparatus according to claim 1, wherein said knock detection threshold value adjusting means changes said knock detection threshold value on the basis of an integration value of said ionic current.

3. The knock detection apparatus according to claim 1, wherein said knock detection threshold value adjusting means changes said knock detection threshold value on the basis of an integration value of said ionic current and a peak value of said ionic current.

4. The knock detection apparatus according to claim 1, wherein said knock detection threshold value adjusting means changes said knock detection threshold value on the basis of an integration value of said ionic current, a peak value of said ionic current and a duty obtained by shaping said ionic current in waveform.

5. The knock detection apparatus according to claim 1, wherein said knock detection threshold value adjusting means smoothens a variation of said knock detection threshold value for every combustion cycle.

6. The knock detection apparatus according to claim 1, further comprising a mask means for regarding a period during which said vibratory component of the ionic current is extracted as a period during which the combustion pulse is generated.

7. A knock detection apparatus for detecting a knock generated in an internal combustion engine and for controlling an ignition timing, in which a vibratory component superimposed on an ionic current generated by combustion of fuel is extracted, said component that is equal to or more than a knock detection threshold value is shaped in waveform into a pulse waveform, a knock strength is calculated through counting and calculation process of the number of pulses of said pulse waveform by an engine controlling means, an ignition timing is controlled on the basis of the knock strength, comprising:

knock detection threshold value adjusting means for changing said knock detection threshold value on the basis of information of an ionic current, wherein said knock detection threshold value adjusting means changes said knock detection threshold value on the basis of an integration value of said ionic current and a peak value of said ionic current.

8. A knock detection apparatus for detecting a knock generated in an internal combustion engine and for controlling an ignition timing, in which a vibratory component superimposed on an ionic current generated by combustion of fuel is extracted, said component that is equal to or more than a knock detection threshold value is shaped in waveform into a pulse waveform, a knock strength is calculated through counting and calculation process of the number of pulses of said pulse waveform by an engine controlling means, an ignition timing is controlled on the basis of the knock strength, comprising:

knock detection threshold value adjusting means for changing said knock detection threshold value on the basis of information of an ionic current, wherein said knock detection threshold value adjusting means changes said knock detection threshold value on the basis of an integration value of said ionic current, a peak value of said ionic current and a duty obtained by shaping said ionic current in waveform.

* * * * *